United States Patent [19] Claus

[11] 4,017,867

[45] Apr. 12, 1977

[54] ANTENNA ASSEMBLY PRODUCING STEERABLE BEAM AND NULL

[75] Inventor: Alfons Jozef Claus, Morristown, N.J.

[73] Assignee: Bell Telephone Laboratories, Incorporated, Murray Hill, N.J.

[22] Filed: Feb. 25, 1976

[21] Appl. No.: 661,060

[52] U.S. Cl. .......................... 343/854; 343/100 SA; 340/6 R

[51] Int. Cl.$^2$ ........................ H01Q 3/26; G01S 3/86

[58] Field of Search .... 343/844, 853, 854, 100 SA; 340/6 R

[56] References Cited

OTHER PUBLICATIONS

Anderson V. C., "Dicanne, A Realizable Adaptive Process," The Jn. of the Acoustical Soc. of America, vol. 45, No. 2, pp. 398–405, 343–854.

Winder A. A., "Sonar System Technology," IEEE Transactions on Sonics & Ultrasonics, vol. SU-22, No. 5, pp. 308–312.

*Primary Examiner*—Eli Lieberman
*Attorney, Agent, or Firm*—H. L. Logan

[57] ABSTRACT

A prior art antenna ass embly comprises an array of elements, a steerable beamformer for producing a desired beam and a processor interconnecting the elements and the beamformer to introduce a steerable null. Presently disclosed is a processor which broadens the steerable null while not adversely affecting its low sensitivity character. This processor includes two or more beamformers uniquely related to one another and means for substracting combinations of their outputs from the various inputs to the steerable beamformer.

4 Claims, 6 Drawing Figures

ANTENNA ASSEMBLY PRODUCING STEERABLE BEAM AND NULL

GOVERNMENT CONTRACT

The invention herein claimed was made in the course of or under a contract with the Department of the Navy.

BACKGROUND OF THE INVENTION

1. Field of the Invention

This invention relates to antenna systems which electronically scan antenna arrays and, in particular, to such systems which have independently controllable beams and nulls in their sensitivity patterns.

2. Description of the Prior Art

Antenna assemblies comprising arrays of antenna elements coupled to beam forming apparatus are well known, particularly in the radar and acoustics fields. Such assemblies have steerable sensitivity patterns having high sensitivity portions called beams and low sensitivity portions called nulls. In use it is often desirable to individually steer the beams and nulls. Such a system is disclosed in "DICANNE, A Realizable Adaptive Process," by V. C. Anderson, pp. 398–405. *The Journal of the Acoustical Society of America*, Vol. 45, No. 2, 1969 and also in "II Sonar Systems Technology," by A. A. Winder, pp. 308–312, *I.E.E.E. Transactions on Sonics and Ultrasonics*, Vol. SU-22, No. 5, September 1975.

The assembly disclosed in the above-identified articles comprises an array of antenna elements, a steerable beamformer which when connected to the elements establishes a sensitivity pattern containing the steerable beam, and a processor having *n* input ports and *n* output ports connected between the elements and the steerable beamformer. The processor comprises a nonsteerable beamformer and delay units. The delay units are connected between the processor input ports and the nonsteerable beamformer for steering a beam in the direction of the null. The output of the nonsteerable beamformer is subtracted from the inputs applied to the processor with the results thereof applied to the processor output ports, respectively. This, in turn, results in a null in the system sensitivity pattern. For some applications, however, the width of the null is less than desirable.

SUMMARY OF THE INVENTION

An object of the present invention is to broaden the null angle in an adaptive antenna assembly of the above-described type.

This and other objects are achieved by the present invention which teaches the addition of at least a second nonsteerable beamformer to the above-described processor. The additional nonsteerable beamformers have their input ports connected to the input ports of the original or first nonsteerable beamformer so that they all receive the same inputs. The nonsteerable beamformers, in accordance with the invention, are constructed so that the first one establishes a sensitivity pattern with a single beam and each subsequent one establishes a sensitivity pattern having a pair of beams whose axes (including axes of rotation) of maximum sensitivity from an angle which includes all such angles formed by its predecessors. Predetermined portions of the outputs from the nonsteerable beamformers are summed in *n* summers. The *n* outputs from the summers are subtracted from the *n* inputs, respectively, to the processor and applied to the processor output ports.

This and other features of the invention will be better appreciated after studying the following detailed discussion relating to the prior art and embodiments of the present invention.

DETAILED DESCRIPTION

Figure 1:
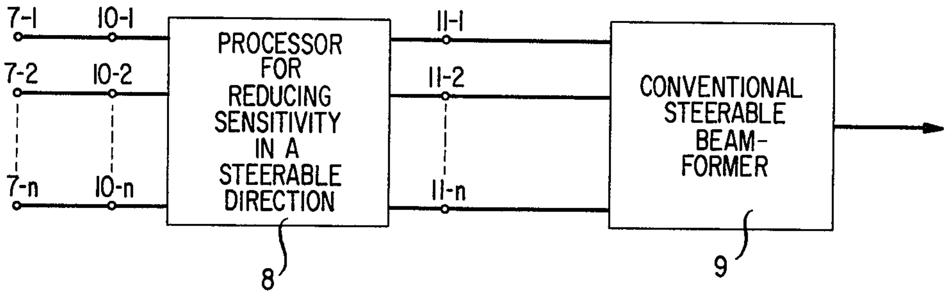
FIG. 1 (PRIOR ART)
FIG. 1 shows a block diagram of the prior art antenna assembly disclosed in the above-mentioned articles.

FIG. 1 shows a block diagram of the receiving antenna system disclosed in the aforementioned Anderson and Winder articles. The system includes a plurality of antenna elements 7-1 through **7-*n*. These elements, as disclosed in the articles, are hydrophones but may be r.f. antenna elements or still other types of elements as appreciated by those skilled in the art. Elements 7-1 through 7-*n* are connected to a processor 8 which in cooperation with the elements generates a sensitivity pattern having a steerable beam. Processor 8 further functions to subtract the signals falling within this beam from each of the inputs to processor 8 and applies the difference signals to a conventional steerable beamformer 9. Because of the beamforming and subtracting action of processor 8, the inputs to beamformer 9** have the signal content in the desired null direction reduced to the level whereby a null in this direction appears in the sensitivity pattern of the overall system.

As appreciated by those skilled in the art, the shapes of the beams and nulls produced by the above-described assembly depend to some extent on the configuration of elements 7-1 through **7-*n***.

Figure 2:
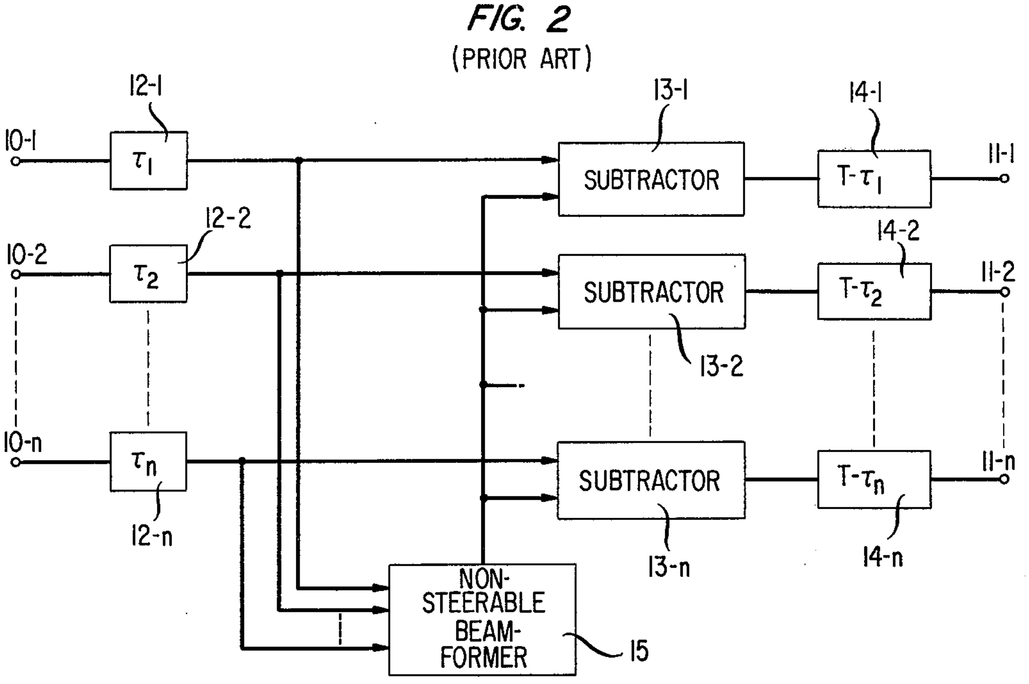
FIG. 2 (PRIOR ART)
FIG. 2 shows a block diagram of the prior art processor of that prior art assembly.

FIG. 2 is a block diagram of the processor disclosed by Messrs. Anderson and Winder. The processor comprises input ports 10-1 through **10-*n*, output ports 11-1 through 11-*n*, delay elements 12-1 through 12-*n* connected to the input ports, subtractors 13-1 through 13-*n* connected to the delay elements, and delay elements 14-1 through 14-*n* connected between the subtractors and the output ports. The outputs of delay elements 12-1 through 12-*n* are also applied to a nonsteerable beamformer 15. The output of beamformer 15 is applied to each of subtractors 13-1 through 13-*n***.

Delay elements 12-1 through **12-*n* have controllable delay values $\tau_1$ through $\tau_n$ and operate to control the direction of the beam in the sensitivity pattern established by nonsteerable beamformer 15 acting in cooperation with antenna elements 7-1 through 7-*n* of FIG. 1. When the output of beamformer 15 is subtracted from the other inputs to subtractors 13-1 through 13-*n*, any signal content falling within the beam established by beamformer 15 is reduced, relatively speaking, in the outputs of the subtractors. Delay elements 14-1 through 14-*n*, which introduce delay values T-$\tau_1$ through T-$\tau_n$, are controlled in synchronism with delay elements 12-1 through 12-*n* to phase-align the remaining signals so that the phase relationship between the signals on ports 11-1 through 11-$n$ are the same as the phase relationships between these signals on ports 10-1 through 10-**$n$.

Figure 3:
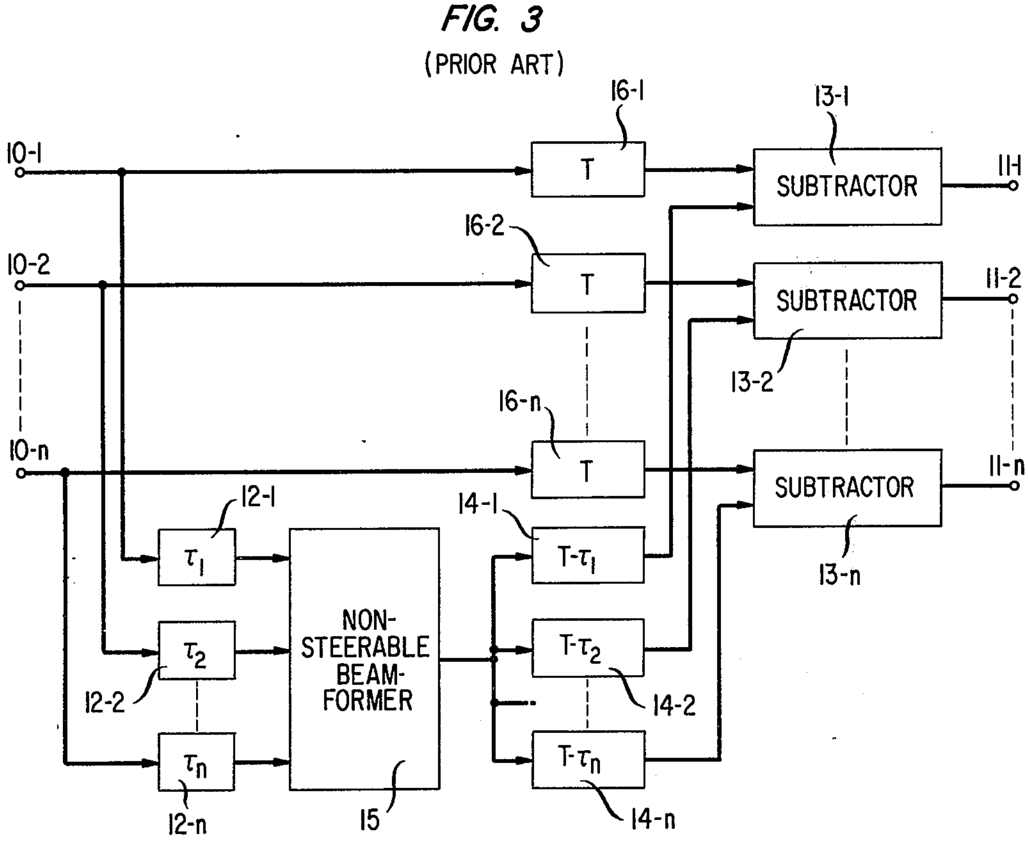
FIG. 3 (PRIOR ART)
FIG. 3 shows a block diagram of the processor of FIG. 2 with changes in delay units.

FIG. 3 is a block diagram of a processor which is very similar to that of FIG. 2. In FIG. 3, delay elements 12-1 through 12-$n$, and delay elements 14-1 through 14-$n$ are in only the input and output paths of nonsteerable beamformer 15. To compensate for time shifts, delay elements 16-1 through 16-$n$ (which each introduce a delay of T) are inserted just prior to subtractors 13-1 through 13-$n$. The processors of FIGS. 2 and 3 function in essentially the same manner; the only difference is in the locations of the various delays.

Figure 4:
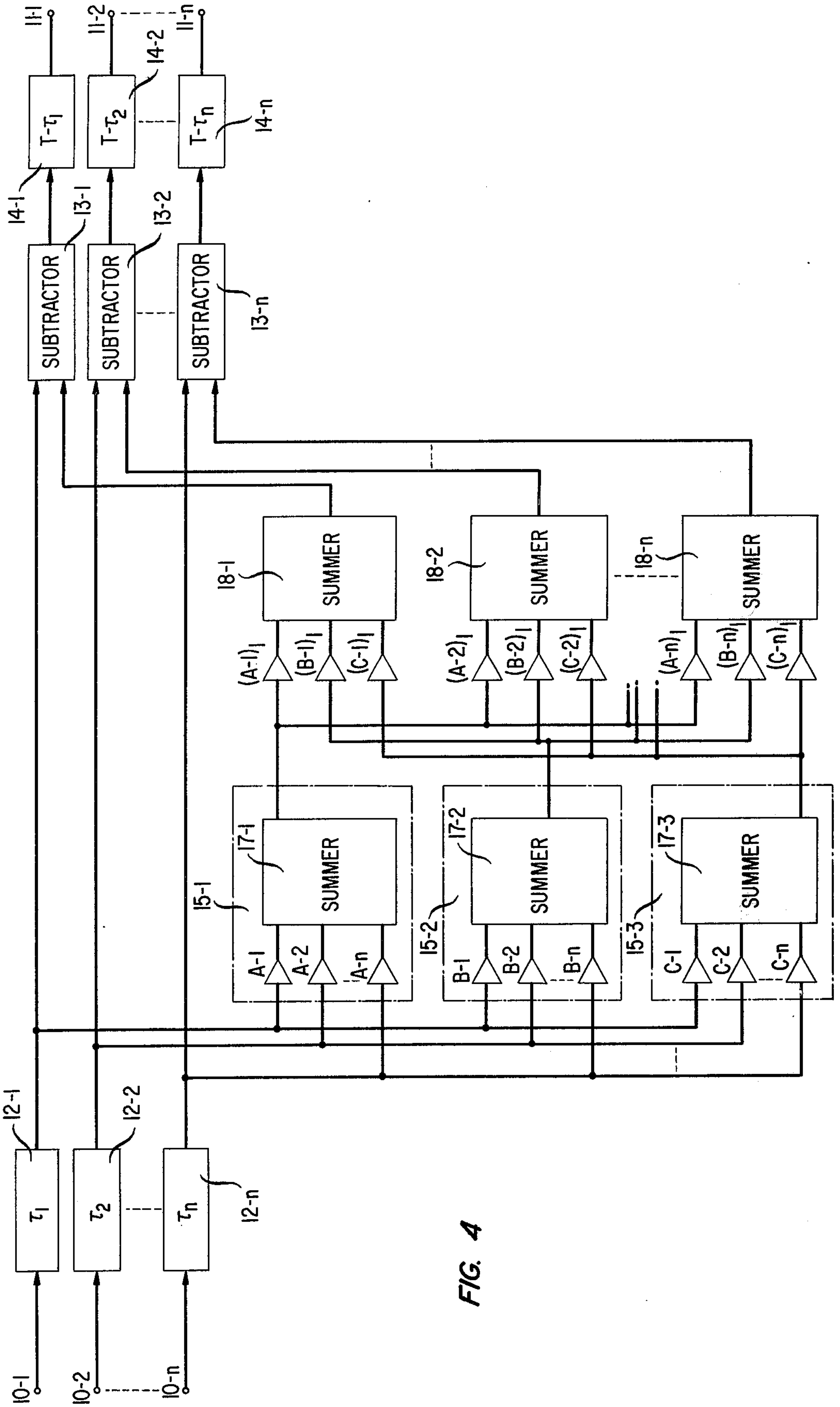
FIGS. 4 and 5 show block diagrams of processors constructed in accordance with the present invention.

FIG. 4 shows a block diagram of an embodiment of the present invention which comprises an improvement of the configuration shown in FIG. 2. Input ports 10-1 through 10-$n$, delay elements 12-1 through 12-$n$, subtractors 13-1 through 13-$n$, delay elements 14-1 through 14-$n$ and output ports 11-1 through 11-$n$ are the same as, and are interconnected the same as, similarly identified components in FIG. 2. The nonsteerable beamformer 15 of FIG. 2 is now identified as 15-1. Two nonsteerable beamformers 15-2 and 15-3 have been added so that their input ports receive the same signals as the input ports of beamformer 15-1.

Figure 6:
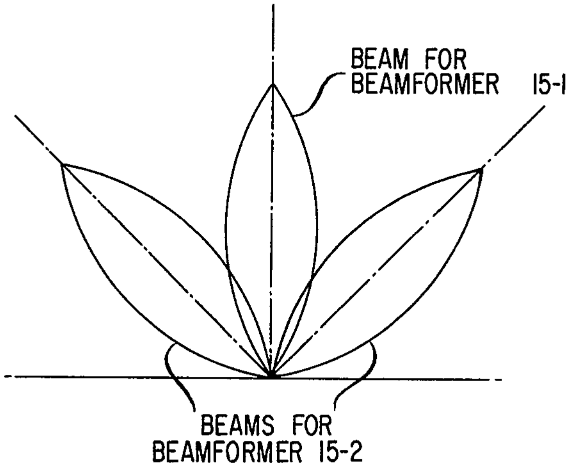
FIG. 6 shows several beam patterns.

Beamformer 15-2 produces a double beam whose axes (including axes of rotation) of maximum sensitivity form an angle which encompasses the axis of the beam of beamformer 15-1. There is some overlapping of the beams as illustrated in FIG. 6 wherein the widths of the beams (and subsequently the angle formed by the beams of beamformer 15-2) are greatly exaggerated for illustration purposes. Beamformer 15-3 similarly produces a double beam whose axes of maximum sensitivity form an angle which encompasses that of the beams of its predecessor. Still more beamformers may be employed as long as this relationship is maintained.

Beamformer 15-1 comprises a plurality of $n$ input amplifiers A-1 through A-$n$ and a summer 17-1 for summing the amplifier outputs. Beamformer 15-2 comprises $n$ input amplifiers B-1 through B-n and a summer 17-2 connected in an identical manner while beamformer 15-3 comprises $n$ input amplifiers C-1 through C-$n$ and a summer 17-3 similarly connected.

The output of beamformer 15-1 is fed in parallel to a plurality of $n$ amplifiers identified as $(A\text{-}1)_1$ through $(A\text{-}n)_1$. In a similar manner, beamformers 15-2 and 15-3 are parallel fed to amplifiers $(B\text{-}1)_1$ through $(B\text{-}n)_1$ and amplifiers $(C\text{-}1)_1$ through $(C\text{-}n)_1$, respectively. Amplifiers $(A\text{-}1)_1$ through $(A\text{-}n)_1$, $(B\text{-}1)_1$ through $(B\text{-}n)_1$, and $(C\text{-}1)_1$ through $(C\text{-}n)_1$ have the same gains as amplifiers A-1 through A-$n$, B-1 through B-$n$ and C-1 through C-$n$, respectively. The outputs of all of the amplifiers with symbols ("letter"-1)$_1$ are fed to a summer 18-1; the outputs of all of the amplifiers with symbols ("letter"-2)$_1$ are fed to a summer 18-2; and so on to the amplifiers with symbols ("letter"-$n$)$_1$ whose outputs are applied to a summer 18-$n$. The $n$ outputs from summers 18-1 through 18-$n$ are fed to subtractors 13-1 through 13-$n$, respectively.

The above-described relationship between the gains of the amplifiers preceding summers 18-1 through 18-$n$ and the gains of the amplifiers in beamformers 15-1 through 15-3 applies for any sort of configuration of elements 7-1 through 7-$n$ of FIG. 1. The gains are, however, dependent on the configuration. A design approach for selecting the gains for a linear array of elements is presented as an example at the end of this discussion.

Figure 5:
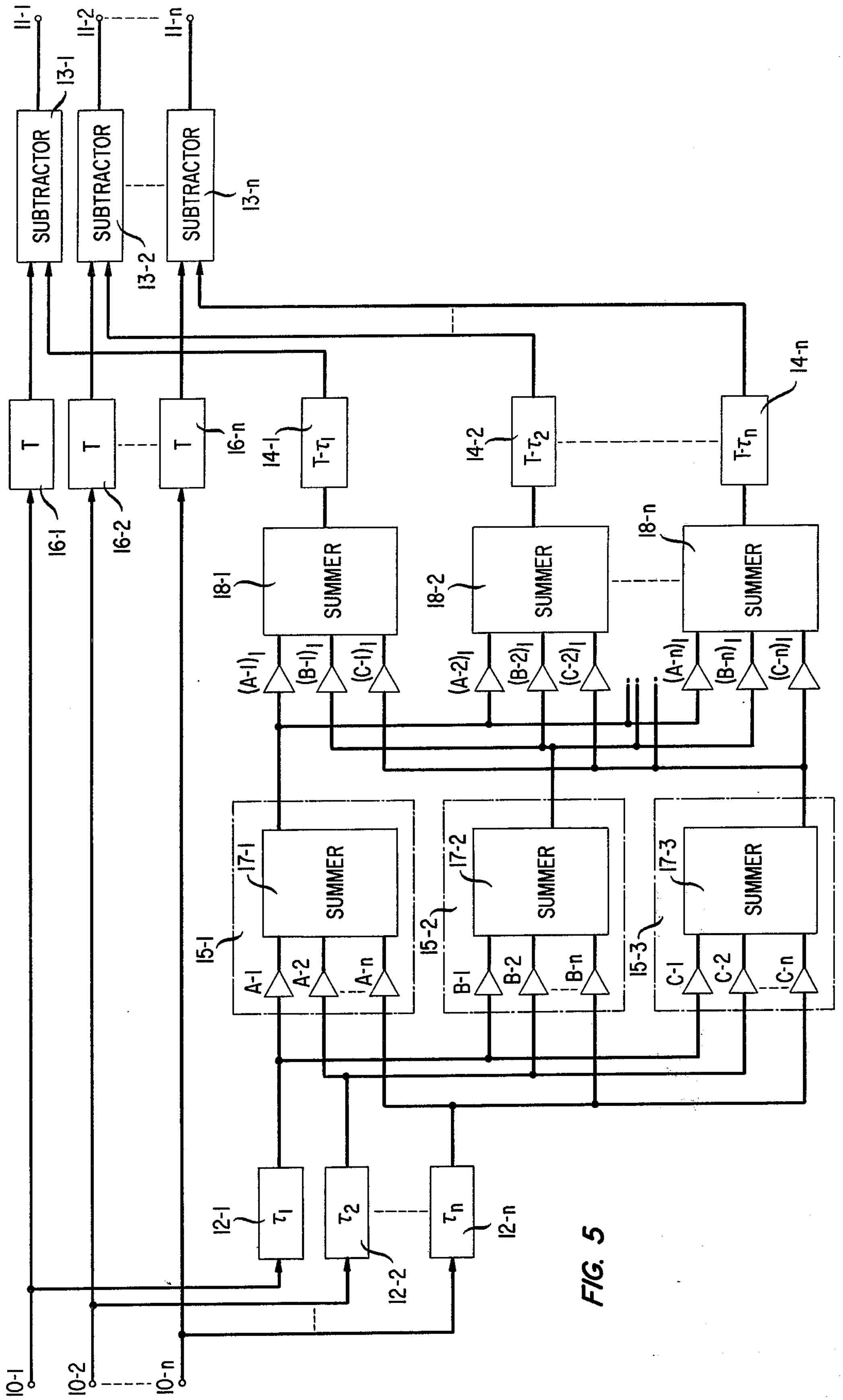

FIG. 5 shows a block diagram of an embodiment of the invention which comprises an improvement of the configuration shown in FIG. 3. This embodiment includes three beamformers 15-1 through 15-3, a plurality of amplifiers identified with parenthetical symbols and summers 18-1 through 18-$n$ as in FIG. 4. The relationships between all of the elements are the same as previously discussed and consequently no further discussion of this embodiment is considered necessary.

Processors built in accordance with the present invention may be used for either receiving or transmitting purposes. When used for transmitting purposes, the processor is connected between the antenna elements and steerable beamformer of FIG. 1 so that its input and output ports are interchanged.

Computation of Amplifier Gains for a Linear Array

The gains are evaluated using spectral decompositions of the covariance matrix of the field in the desired null. As far as the computations to be discussed are concerned, it is sufficient to assume that the field is centered at broadside. Off-broadside fields are suppressed by appropriate steering delays produced by delay elements 12-1 through 12-$n$.

Gains can be evaluated taking any of several matrices as a starting point. The common feature in all these matrices is that the width of their eigenvalue spectrum increases with increasing frequency and/or sector width to be suppressed. For the sake of illustration, we shall consider a linear array of length L consisting of $n$ sensors with spacing $r_{kl}$ between the $k$th and l-th sensor.

Assume that an angular sector centered at broadside and spanning an angle $2\theta$ must be suppressed. Let $$\alpha = 2\,(L/\lambda)\sin\theta, \qquad (1)$$

where $\lambda$ is the acoustic wavelength at frequency $f$. We consider the matrix $Q(\alpha)$ with $(k,l)$ - element, $$Q_{kl}(\alpha) = \frac{\sin \pi\alpha \frac{r_{kl}}{L}}{\pi\alpha \frac{r_{kl}}{L}}. \qquad (2)$$

The matrix $Q(\alpha)$ is the covariance matrix, at frequency $f$, of a random field generated by a spherically uniform source distribution but limited to within the sector. $Q(\alpha)$ has the spectral representation, $$Q(\alpha) = \sum_{r=1}^{r} a_r u_r u_r', a_1 \geq a_2 \geq \ldots \geq a_n, \qquad (3)$$

where the eigenvalues $a_r$ are real and non-negative and the eigenvectors $u_r$ are all real. The number of nonsteerable beams to be used is essentially the number of eigenvalues in (3) collectively representing most of the energy in the interferer noise field. This number depends on the sector width and on the maximum frequency at which this width must be maintained. Let $\alpha_{max}$ be the corresponding value of $\alpha$(see (1)).

In the computational procedures to be outlined, we shall only retain those terms in (3) commensurate with the maximum required suppression. The maximum achievable suppression $\rho_{max}$ keeping only the first $p$ terms in (3) is given by, $$\rho_{max} = -10 \log \left( \frac{1}{n} \sum_{r=p+1}^{n} a_r \right). \quad (4)$$

Thus, with $\rho_{max}$ specified, (4) gives the integer $p$.

We now introduce a slightly different notation to facilitate the description of the required computational steps. For $\alpha = \alpha_{max} \triangleq \alpha_p$, we write (3) as $$Q(\alpha_p) = \sum_{r=1}^{n} a_{pr} u_{pr} u'_{pr}. \quad (5)$$

Thus, the eigenvalues $a_{pr}$ and eigenvectors $u_{pr}$, $r = 1,2,3, \ldots, n$, correspond to the value $\alpha_p$ of $\alpha$; let, $\epsilon = a_{pp}$.

The shading factors are now computed as outlined in the steps below.

1. Determine the value $\alpha_s$ of $\alpha$ for which the matrix $Q(\alpha)$ has its $s$th eigenvalue equal to $\epsilon$; $s = p-1, p-2, \ldots, 3, 2$. Obtain the corresponding spectral decomposition of $Q(\alpha_s)$, $$Q(\alpha_s) = \sum_{r=1}^{n} a_{sr} u_{sr} u'_{sr}. \quad (6)$$

The notation used in (6) is similar to that used in (5). We thus have, $a_{22} = a_{33} = \ldots = a_{pp} = \epsilon$.

2. Construct the sequence of matrices $U_s$, $s = 2,3, \ldots, p$, where $U_s$ is defined as, $$U_s = (u_{s1}\ u_{s2} \ldots u_{ss}).$$

3. Construct the sequence of matrices $V_s$, $s = 2,3, \ldots, p$, according to the relations, $$V_p = U_p,$$

$$V_{s-1} = V_s(V_s'\ V_s)^{-1} V_s'\ U_{s-1},$$

$$s = p, p-1, \ldots, 3.$$

Denote the $r$th column of $V_s$ by $v_{sr}$, $$V_s = (v_{s1}\ v_{s2} \ldots v_{ss}),$$

$$s = 2, 3, \ldots, p.$$

4. Compute the vectors $g_1$ and $g_2$ according to, $$g_1 = \frac{v_{21}}{\|v_{21}\|},$$

$$g_2 = \frac{v_{22} - (g_1' v_{22}) g_1}{\|v_{22} - (g_1' v_{22}) g_1\|},$$

where $\|v_{sr}\|$ denotes the length of the vector $v_{sr}$. Define the matrix $G_2$ as, $$G_2 = (g_1\ g_2)$$

Perform steps 5 and 6 for $s = 3, 4, \ldots, p$.

5. Among the vectors $v_{s1}, v_{s2}, \ldots, v_{ss}$, find the vector for which the quantity $$\frac{v_{sr}' G_{s-1} G_{s-1}' v_{sr}}{v_{sr}' v_{sr}}$$

is the smallest; denote the resulting vector by $c_s$.

6. Compute $g_s$ using $$g_s = \frac{c_s - G_{s-1} G_{s-1}' c_s}{\|c_s - G_{s-1} G_{s-1}' c_s\|},$$

and define $$G_s = (G_{s-1} \mid g_s).$$

The gains capable of suppressing a sector of width $2\theta$ up to frequency $f_{max}$ are the elements of the matrix $G_p$. In particular, the gains associated with the $s$th nonsteerable beam are the components of the vector $g_s$, for $s = 1, 2, 3, \ldots, p$.

What is claimed is:

1. In an antenna assembly comprising an array of antenna elements, a steerable beamformer which when connected to said elements establishes a sensitivity pattern containing a steerable beam, and a processor having input ports identifiable as 1 through $n$ and output ports identifiable as 1 through $n$, said processor being connected between said elements and said steerable beamformer for reducing the sensitivity of said assembly in a steerable direction, an improvement CHARACTERIZED IN THAT said processor comprises at least two nonsteerable beamformers having their input ports connected in common, means connected between said nonsteerable beamformer input ports and said processor input ports to steer a beam produced by a first of said nonsteerable beamformers in a desired direction, said nonsteerable beamformers constructed so that said first nonsteerable beamformer establishes a sensitivity pattern with a single beam and each subsequent nonsteerable beamformer establishes a sensitivity pattern having a pair of beams whose axes of maximum sensitivity form an angle which includes all such angles formed by its predecessors, a plurality of summers identifiable as 1 through $n$ for summing predetermined portions of the outputs from said nonsteerable beamformers, and means for subtracting the output of each of said summers from the input to the similarly identified processor input port and applying the difference to the similarly identified processor output port, whereby signals in said differences have the same phase relations with respect to one another as they have in said processor inputs.

2. An assembly in accordance with claim 1 in which each of said nonsteerable beamformers comprises a plurality of amplifiers connected in series with its input ports, respectively, and a summer for summing the outputs of its amplifiers, and each of said 1 through $n$ summers comprises a plurality of amplifiers connected in series with its input ports, respectively, and means for summing the outputs of its amplifiers, the gain of each of said summer amplifiers being substantially equal to that of the amplifier which both is in the nonsteerable beamformer to which the summer amplifier is connected and is connected to the processor input port similarly identified as said summer containing said summer amplifier.

3. In an antenna assembly having a steerable null and a steerable beam in its sensitivity pattern where said assembly comprises an array of antenna elements, a steerable beamformer which when connected to said elements establishes a sensitivity pattern containing said steerable beam, and a processor having input ports identifiable as 1 through *n* and output ports also identifiable as 1 through *n*, said processor being connected between said elements and said steerable beamformer, and furthermore, said processor comprising a nonsteerable beamformer, first means connected between said input ports and said nonsteerable beamformer for steering a beam in the sensitivity pattern established by said nonsteerable beamformer in the direction of said null, and second means for subtracting the output of said nonsteerable beamformer from each of the inputs applied to said input ports and applying the results thereof to said output ports corresponding to the input ports contributing to said results, said second means including delay means to cause the signals in said results to have the same phase relations with respect to one another as they have in said inputs, an improvement CHARACTERIZED IN THAT said processor further comprises at least a second nonsteerable beamformer having its input ports connected to the input ports of said first nonsteerable beamformer, said nonsteerable beamformers constructed so that said first nonsteerable beamformer establishes a sensitivity pattern with a single beam and each subsequent nonsteerable beamformer establishes a sensitivity pattern having a pair of beams whose axes of maximum sensitivity form an angle which includes all such angles of its predecessors, and a plurality of summers, identifiable as 1 through *n*, for summing predetermined portions of the outputs from said nonsteerable beamformers and applying the summer outputs to said second means to subtract the output of each of said summers from said input on the similarly identified processor input port.

4. An assembly in accordance with claim 3 in which each of said nonsteerable beamformers comprises a plurality of amplifiers connected in series with its input ports, respectively, and a summer for summing the outputs of its amplifiers, and each of said 1 through *n* summers comprises a plurality of amplifiers connected in series with its input ports, respectively, and means for summing the outputs of its amplifiers, the gain of each of said summer amplifiers being substantially equal to that of the amplifier which both is in the nonsteerable beamformer to which the summer amplifier is connected and is connected to the processor input port similarly identified as said summer containing said summer amplifier.

* * * * *